United States Patent
Gisin et al.

(12) 
(10) Patent No.: US 6,438,234 B1
(45) Date of Patent: Aug. 20, 2002

(54) QUANTUM CRYPTOGRAPHY DEVICE AND METHOD

(75) Inventors: Nicolas Gisin, Geneva (CH); Bruno Huttner, Collonges-sous-Saléve (FR); Antoine Muller; Hugo Zbinden, both of Geneva (CH); Beat Perny, Kleinbösingen (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/262,748

(22) Filed: Mar. 5, 1999

Related U.S. Application Data

(63) Continuation of application No. PCT/EP97/04575, filed on Aug. 15, 1997.
(60) Provisional application No. 60/025,839, filed on Sep. 5, 1996.

(51) Int. Cl.[7] .................................................. H04K 1/00
(52) U.S. Cl. .................... 380/256; 380/44; 380/278; 380/283; 380/28; 380/260; 380/256
(58) Field of Search .................... 380/44, 278, 283, 380/260, 256; 359/112

(56) References Cited

U.S. PATENT DOCUMENTS

| | | | |
|---|---|---|---|
| 5,307,410 A | | 4/1994 | Bennett |
| 5,515,438 A | * | 5/1996 | Bennett et al. ............. 380/278 |
| 5,675,648 A | * | 10/1997 | Townsend .................... 380/278 |
| 5,757,912 A | * | 5/1998 | Blow et al. .................. 380/256 |
| 5,953,421 A | * | 9/1999 | Townsend .................... 380/283 |
| 6,188,768 B1 | * | 2/2001 | Rethune et al. ............. 380/278 |

FOREIGN PATENT DOCUMENTS

| | | |
|---|---|---|
| WO | 95/07583 | 3/1995 |
| WO | 96/07951 | 3/1996 |

OTHER PUBLICATIONS

Bennett et al., Quantum Cryptograph: "Public Key Distribution and Coin Tossing", International Conference on Computers, Systems & Signal Processing, Dec. 10–12, 1984, pp. 175–179.

Bennett et al., "Quantum Cryptography", Scientific America, Oct. 1992, pp. 26–33.

Charles H. Bennett, "Quantum Cryptography Using Any Two Nonorthogonal States", Physical Review Letters, May 25, 1992, vol. 68, No. 21, pp. 3121–3124.

* cited by examiner

*Primary Examiner*—Gail Hayes
*Assistant Examiner*—James Seal
(74) *Attorney, Agent, or Firm*—Pillsbury Winthrop LLP

(57) ABSTRACT

A system and method for communicating a key between two stations using an interferometric system for quantum cryptography. The method includes sending at least two light pulses over a quantum channel and detecting the interference created by the light pulses. The interfering pulses traverse the same arms of an interferometer but in a different sequence such that the pulses are delayed when traversing a quantum channel. The pulses are reflected by Faraday mirrors at the ends of the quantum channel so as to cancel any polarization effects. Because the interfering pulses traverse the same arms of an interferometer, there is no need to align or balance between multiple arms of an interferometer.

44 Claims, 2 Drawing Sheets

ALICE

BOB

QUANTUM CRYPTOGRAPHY DEVICE AND METHOD

This is a continuation of International Appln No. PCT/EP97/04575 which claims benefit of Provisional appln. No. 60/025,839 filed Sep. 5, 1996.

This invention relates to an optical communication system and method configured for the distribution of a key using quantum cryptography.

PRIOR ART

The purpose of cryptography is to exchange messages in perfect privacy between two users, conventionally known as Alice and Bob. Cryptography methods often use a publicly announced encrypting and decrypting algorithm; the confidentiality of the information relies entirely on a key which must be used as an input to the decrypting algorithm for decrypting the received messages.

The key usually consists of a randomly chosen, sufficiently long string of bits. Once the key is established, subsequent messages can be transmitted safely over a public channel. However, two users wanting to communicate must at a certain stage use a secure channel to share the key. With conventional key transmission methods, which can be subject to passive monitoring by an eavesdropper, it is impossible to transmit a certifiably secret key, and cumbersome physical security measures are required. However, secure key distribution is possible using quantum techniques. In quantum cryptography, the key is exchanged through a quantum channel. Its security is based on the principles of quantum mechanics which state that any measurement of a suitably chosen quantum system will inevitably modify the quantum state of this system. Therefore, an eavesdropper, Eve, might get information out of a quantum channel by performing a measurement, but the legitimate users will detect her and hence not use the key. In practice the quantum system may be a single photon propagating through an optical fiber, and the key can be encoded by its polarization or by its phase, as proposed by Ch. Bennett and G. Brassard in <<Quantum Cryptography: Public key distribution and coin tossing>>, *Proceedings of the International Conference on Computers, Systems and Signal Processing*, Bangalore, India, 1984, pp. 175–179 (IEEE, New York, 1984).

Interferometric quantum key distribution systems are usually based on a double Mach-Zehnder interferometer, one side for Alice and one for Bob (see FIG. 1). These interferometers implement time-multiplexing, as both interfering pulses follow the same path between Alice and Bob, with some time delay. However, the pulses follow different paths within both Alice's and Bob's interferometers. In order to obtain a good interference, both users therefore need to have identical interferometers, with the same coupling ratios in each arm and the same path lengths, and also need to keep them stable within a few tens of nanometers during a transmission. Therefore, one interferometer has to be adjusted to the other every few seconds to compensate thermal drifts. Moreover, since optical components like phase modulators are polarization dependent, polarization control is necessary both in the transmission line and within each interferometer. In polarization-based systems, the polarization has to be maintained stable over tens of kilometers, in order to keep aligned the polarizers at Alice's and Bob's. Obviously, this is inconvenient for practical applications.

One technical problem the invention wishes to solve is thus to find an improved device and an improved method of quantum cryptography.

According to various aspects of the present invention, these improvements follow from the features of the characterizing part of the independent claims.

More specifically, these improvements follow from one system in which the interfering pulses run over the same branches of the interferometer, but in another sequence, so that they are delayed in time when they run over said quantum channel.

The system of the invention thus allow a system to be built which needs no alignment or balancing of the interferometer. Using the system of the invention, Alice and Bob can thus exchange information, e.g. a cryptographic key, through a standard telecommunication channel. The users at both ends of a channel only need to plug in the inventive sending/receiving station and the inventive key encoding station, synchronize their signals, and start the exchange.

According to another aspect of the present invention, cancellation of polarization effects is obtained by using Faraday mirrors at the end of the fibers.

The invention will be explained in more detail, by way of example, with reference to the drawings in which.

Figure 1:
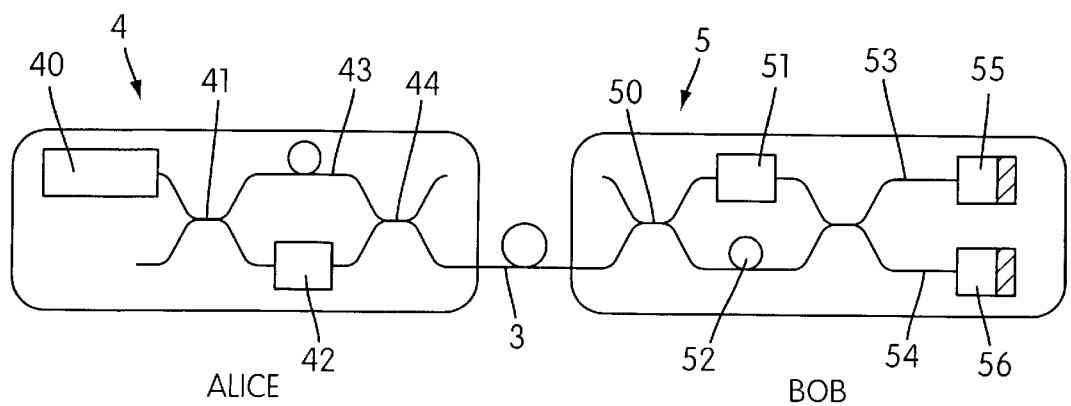
FIG. 1 is a schematic representation of a conventional Mach-Zehnder interferometer for quantum cryptography, according to the prior art.

FIG. 1 shows a block diagram of a conventional Mach-Zehnder interferometer for quantum cryptography, as described for instance in U.S. Pat. No. 5,307,410 (Benett). A laser source 40 in Alice's device emits a short laser pulse toward Bob. The laser pulse is split into two time-shifted pulses P1 and P2 by Alice: one goes through a short path and through a phase-modulator 42; and the second is delayed by a longer path 43. Two couplers (beam-splitters) 41 and 44 are needed to split the laser pulse. Information about the key is encoded in the phase shift introduced by the phase modulator 42.

After propagation along the optical fiber 3, the two time-shifted pulses P1 and P2 arrive in a similar interferometer on Bob's side, creating three pulses. The first pulse is produced from P1 running over a short branch, comprising a phase modulator 51, on Bob's side. The last pulse is produced from P2 running over a delaying part 52 on Bob's side. Those two pulses carry no information on the phase setting. The middle pulse is obtained by interference between P1 running over the delay line on Bob's side with P2 running over the short branch 51. The relative phase settings creates a constructive or destructive interference in the detectors 55 and 56.

In order to obtain a good visibility, the two interferometers 4 and 5 have to be kept identical, and should preserve polarization. In particular, the length of the delay lines 43, 52 in both interferometers must be exactly the same. This is usually done, according to the prior art, by adjusting one interferometer to the other every few seconds to compensate thermal drifts.

Figure 2:
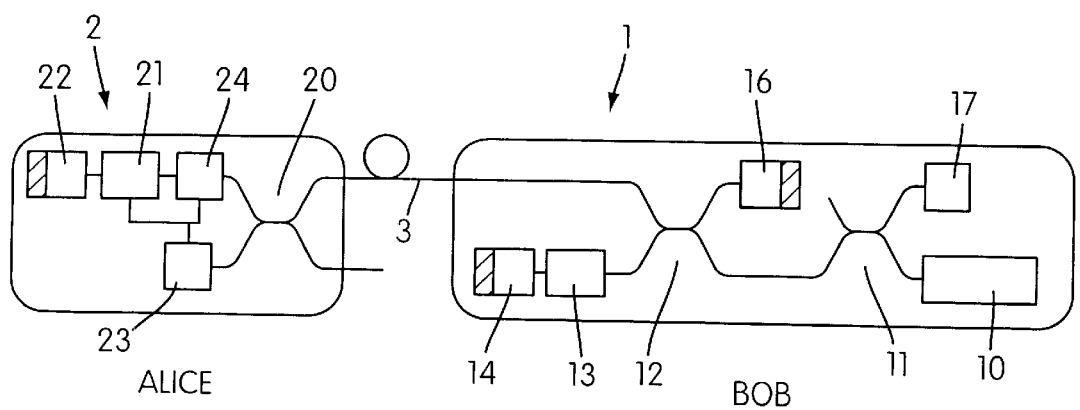
FIG. 2 is a schematic representation of a first embodiment of a device according to the invention.

A first embodiment of an optical communication system configured for the distribution of a key using quantum cryptography according to the invention, implementing phase-encoded quantum key distribution, and based on time multiplexing, is shown on FIG. 2. This embodiment features a 2×2 coupler 12. In principle, we have an unbalanced Michelson interferometer at Bob's side (1) with one long arm going to Alice. On Bob's side, the sending/receiving station I comprises a pulsed laser 10, a first coupler 11, a Faraday mirror 16, a second coupler 12, a phase modulator 13, a second Faraday mirror 14 and a single photon detector 17. The laser 10 may be, e.g., a DFB laser and produces e.g. 300 ps long pulses at 1300 nm, with a repetition rate of e.g. 1 kHz. On Alice's side, the key encoding station 2 comprises a coupler 20, a detector 23, a phase modulator 21, a Faraday mirror 22 and an attenuator 24 controlled by the detector 23. Alice and Bob's device are coupled on both side of a quantum channel 3, for example, on both sides of an optical channel comprising a single mode optical fiber.

Bob initiates the transmission by sending a short laser pulse towards Alice. Let us for the moment disregard the effects of the Faraday mirrors 16, 14, 22, and consider them as usual mirrors. The need for coupler 20 and detector 23 in Alice's arm will also be explained later. The pulse arriving in the coupler 12 is split into two parts: one part, P1, goes directly towards Alice; while the second part, P2, is first delayed by one bounce in the mirrors 14 and 16 (delay line). The two pulses, P1 and P2, travel down the fiber to Alice. In order to encode her bits, Alice lets the first pulse P1 be reflected by the mirror 22, but modulates the phase of the second pulse P2 by means of a phase modulator 21 situated in front of the mirror 22 (phase shift $\phi_A$). The two pulses then travel back to Bob. Detection on Bob's side is done by delaying part of P1 in the same delay line 14–16. Bob lets pulse P2 unaltered but modulates the phase of the first pulse P1 with the phase modulator 13 situated in front of the mirror 14 (phase shift $\phi_B$). This pulse then interferes with P2. If the phase modulators at both Alice's and Bob's are off, or if the difference $\phi_A - \phi_B = 0$ (same phase shift applied to the two pulses P1 and P2), then the interference will be constructive (the two pulses follow exactly the same path). If however Alice or Bob change their phase setting between the two pulses, the interference may become destructive. Totally destructive interference is obtained when: $\phi_A - \phi_B = \pi$, where $\phi_A$ and $\phi_B$ are the total phase shifts introduced by Alice and Bob respectively, i.e. the phase shifts corresponding to a return trip through the phase modulators. In this case no light is detected at single photon detector 17. Note that it is essential that the interference obtained when the phase shifts are different is totally destructive. This ensures that, when Bob obtains a detection event, he can be certain that Alice did not use a different phase, and thus that she used the same phase as himself.

This shows that the relative phase setup modulates the intensity in the detector 17, and thus can be used to transfer information from Alice to Bob. The first attractive features of this setup are that the interferometer is automatically aligned (both pulses are delayed by the same delay line), and that the visibility of the fringes is independent of the transmission/reflection coefficients of the coupler 12.

Of course, a large fraction of the light does not follow these two paths, but is split differently at various couplers (e.g. keeps oscillating a few times between 14–16 or 16–22 before leaving towards the detector 17). These pulses will eventually arrive in the detector 17, but at a different time, and will be easily discriminated. Therefore, they do not reduce the visibility. Of particular interest is the fraction of P1 coming back from Alice to Bob, and which goes directly onto the detector 17, thus arriving before the two interfering pulses. We shall show in the following that this pulse is required to prevent some type of eavesdropping strategy. Please note that, as the distance between Alice and Bob is much longer than the length of Bob's interferometer, the time delay between the two pulses arriving in Bob's setup (i.e. the time between P2 leaving and P1 coming back) is much longer than the time between the pulses in Alice's setup: a span of 10 km between Alice and Bob corresponds to 0.1 ms. This means that Bob's station needs to remain stable for times longer than that, but this is not a problem for a short interferometric system. On the other hand, assuming a distance between the mirrors 14 and 16 of 3 m, the time delay between the pulses arriving at Alice's is only 30 ns. This means that there is absolutely no problem of stability, even for a very long transmission line. However, in order to encode her bits, Alice needs to have a fast phase modulator 21 (about 100 MHz). This fast modulation is needed in order to be able to modulate the phase of the pulse P2 arriving at Alice's, without altering the phase of P1. This is no problem with existing Lithium Niobate (LiNbO$_3$) modulators. A similar, or slower, phase modulator may be used on Bob's side. Other phase modulators are described in WO96/07951.

The above setup would work perfectly well for ideal fibers, with no birefringence. Unfortunately, all existing optical fibers have birefringence, which will modify the state of polarization of the light, and may lead to a reduction in the visibility of the interference. In order to preserve interference, we use instead of usual mirrors so-called Faraday mirrors 14, 16, 22. A Faraday mirror is simply an ordinary mirror, glued on a Faraday rotator, which rotates the polarization by 45°.

The effect of a Faraday mirror is to transform any polarization state into its orthogonal, i.e., the polarization state of the reflected pulse on each point of the optical fiber is orthogonal to the polarization state of the received pulse. Replacing ordinary mirrors 14 and 16 by Faraday mirrors (i.e., adding the Faraday rotators) thus ensures that the two pulses P1 and P2 have the same polarization, irrespective of birefringence effects in the delay line 14–16. Therefore, the polarization state of the pulse P2 is unchanged by the double bounce on the Faraday mirrors 14 and 16, and similarly for the state of P1, bouncing on the Faraday mirrors 16 and 14 on its way to the detector 17. Note that the above is not necessarily true for the pulses P1 and P2 propagating down the long transmission fiber (several kilometers long). Due to the influence of the earth magnetic field, which creates a small Faraday effect in the fiber itself, and of possible rapid fluctuations in the birefringence, the polarization state of the returning pulses is not necessarily orthogonal to the input polarization state. However, what is important in our setup is that the two interfering pulses P1 and P2 have the same polarization.

Use of a Faraday mirror 22 in Alice's enables one to compensate for the polarization dependence of the phase modulator 21, as well as for polarization dependent losses.

Until now, we have only discussed macroscopic pulses. In order to get quantum cryptographic security, the information carrying pulses need to be very weak, with at most one photon per pulse, as explained by C. H. Benett, G. Brassard and A. K Ekert, <<Quantum Cryptography>>, *Scientific American* 267, pp. 50–57, 1992. This is to prevent a malevolent eavesdropper, known as Eve, to divert part of the pulse and get information on the key. In practice, we rely on strongly attenuated laser light. Since the photon distribution of this light is Poissonian, in order to ensure that the probability of more than one photon is weak enough, we use about 0.1 photon per pulse on average. This attenuation may be obtained by adding the extra strongly transmitting coupler 20 in Alice's arm with a transmission coefficient $t_3 \approx 1$. This creates enough attenuation on the beams reflected by the mirror 22 to have a single-photon-like pulse sent back to Bob, as well as maximizes the intensity going to the detector 23, and thus enables an ordinary detector 23 to be used, and not a single-photon one. If the attenuation is not sufficient, Alice may add an extra attenuator 24, controlled by the detector 23, in front of her setup. Using the detector 23, Alice can monitor the intensity of the incoming pulses, and control the attenuation to ensure that the pulse P2 going back to Bob has indeed the correct intensity. (Remember that the pulses going from Bob to Alice do not carry any phase information yet; it is only on the way back to Bob that the phase chosen by Alice is encoded in the pulse P2.

Monitoring the incoming intensity has the added advantage that Alice can detect any attempt by Eve to obtain the value of her phase shift by sending much stronger pulses in the system, and measuring the phase of the reflected pulses.

On Bob's side, the light detector 17 needs to be a single-photon detector, for instance an $LN_2$-cooled avalanche photo diode biased beyond breakdown and operating in the Geiger mode. The bias voltage of the diode is the sum of a DC part well below threshold and a short, for instance 2 ns, rectangular pulse that pushes the diode e.g. 1.0 V over threshold when a photon is expected. This time window allows the number of darkcounts to be reduced considerably and for discriminating non relevant pulses. Furthermore, in order to obtain as much of the light as possible on the detector 17, the coupler 11 has to be strongly transmitting, with transmission coefficient $t_1 \approx 1$.

This system can be used to implement B92 protocol, or two-states protocol, suggested by C. H. Bennet in <<Quantum Cryptography Using Any Two Nonorthogonal States>>, *Physical Review Letters* 68, pp. 3121–3124, 1992. Both Alice and Bob choose at random their phase settings, so that the overall phase shifts in the phase modulators 13 and 21 are 0 or $\pi$, corresponding, respectively, to bit value 0 and 1. Note that these are overall phase shifts, corresponding to the return trip of the pulses. Therefore, if a detection, i.e. constructive interference, occurred, Alice and Bob know that they applied the same phase shift, and that they had the same bit value: if Bob chooses bit 0, and gets one count in his detector, he knows that Alice has also sent a 0, and reciprocally for bit 1.

If Alice and Bob use different phase shifts, the difference is always $\pi$, which means that the interference in the single photon detector 17 is always destructive, and that no count should be registered. Of course, since they use very weak pulses, in many instances Bob would get no count in the detector 17. In this case, he cannot infer what was sent by Alice: it could be that Alice used a different phase; or it could be that there was simply no photon in the pulse. We can now understand why very weak pulses are needed: if Alice and Bob use strong pulses, which always carry more than one photon, Bob would always know the bit sent by Alice: one count, same choice of phase; no count, different choice of phase. Unfortunately, so would Eve. For example, she could simply split the pulses, by adding an extra coupler on the line, and by measuring the phase of the pulses sent by Alice. However, if the pulse sent by Alice possesses at most one photon, this simple eavesdropping strategy fails completely: if Eve measures the photon, then Bob will not get it, and would simply discard the corresponding transmission.

Another eavesdropping strategy on two-state systems would be for Eve to stop the transmission altogether, measure as many pulses as she could, and send to Bob only the ones she managed to obtain. To prevent this, Alice needs to send both a strong pulse P1, as a reference, and a weak one P2, containing the phase information. Eve cannot suppress the strong pulse without being immediately discovered. If she suppresses only the weak one, because she did not obtain the phase information, the strong pulse alone will introduce noise in the detector 17. In the system of the invention, this is easily implemented by using a strongly asymmetric coupler 12, with transmission coefficient $t_2 \approx 1$, and reflection coefficient $r_2 \approx 0$. In this case, the pulse P1 going back towards Bob is much stronger than the pulse P2, which has already been through the 14–16 delay line, and thus was strongly attenuated. Bob can detect the part of the pulse P1 going directly to the detector 17, before looking at the interference. It is also possible to add an extra coupler and detector in front of the Faraday mirror 16, in a way similar to Alice's setup.

The same setup, but with different choices of phase for Alice and Bob can be used to implement other protocols, such as the BB84 protocol described by Ch. Bennett and G. Brassard in <<Quantum Cryptography: Public key distribution and coin tossing>>, *Proceedings of the International Conference on Computers, Systems and Signal Processing*, Bangalore, India, 1984, pp. 175–179 (IEEE, New York, 1984). According to this protocol, Alice chooses among four possible states. In another example, if Alice's phase shifts are not 0 and $\pi/2$, but 0 and any angle $\alpha$, it is easy for Bob to compensate by using $\pi-\alpha$ and $\pi$, so that when Bob uses the wrong phase shift, the interference is totally destructive.

Figure 3:
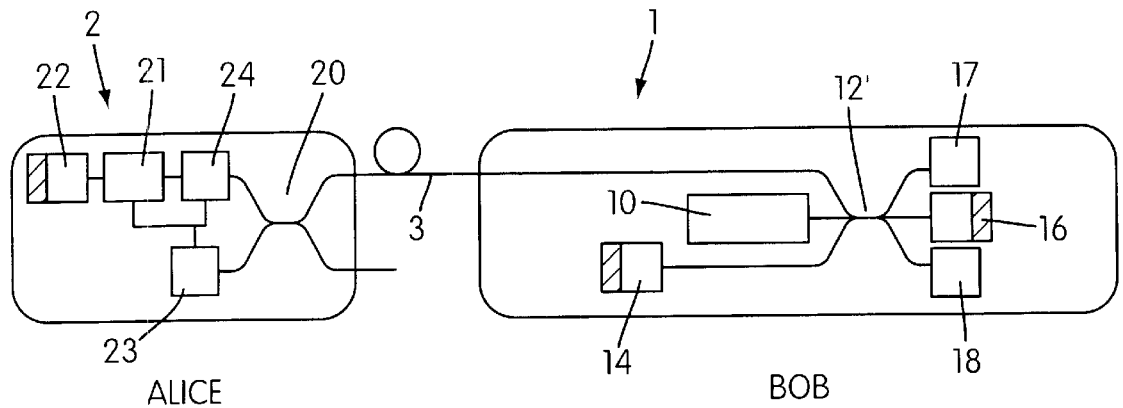
FIG. 3 is a schematic representation of a second embodiment of a device according to the invention.

FIG. 3 shows a block diagram of a second embodiment of an optical communication system according to the invention, configured for the distribution of a key using quantum cryptography and implementing phase-encoded quantum key distribution. This embodiment features a 3×3 coupler 12'. On Alice's side, the same key encoding station 2 as in the first embodiment can be used. On Bob's side, the sending/receiving station 1 comprises a laser 10, a 3×3 coupler 12', a first Faraday mirror 14, a second Faraday mirror 16, and two single-photon detectors 17 and 18.

The first pulse P1 follows the following sequence of branches:

Laser 10–mirror 16–mirror 22 (on Alice's)–mirror 16 (on Bob's)–mirror 14–detectors 17, 18.

The other pulse P2 follows the following sequence of branches:

Laser 10–mirror 16–mirror 14–mirror 16 –mirror 22 (on Alice's) and to the detectors 17, 18.

Depending on the phase difference between the pulses P1 and P2, a constructive interference will be detected either on the detector 17 or on the detector 18. The choice of phase by Alice, either $\pi/3$ or $-\pi/3$ sends the photon either in the detector 17 or in the detector 18 respectively.

The main advantage of using two detectors 17 and 18 is that we do not need a second phase modulator on Bob's side to implement the B92 protocol. The drawback is the need for two single photon detectors 17 and 18.

Adding a second phase modulator before the Faraday mirror 14, as in the previous system, enables the BB84 system to be efficiently implemented: Alice chooses among the four possible phases: $\pi/3$, $-\pi/3$, $2\pi/3$ and $-2\pi/3$; while Bob chooses only between 0 (which enables him to differentiate between $\pi/3$ and $-\pi/3$), and $\pi$(which enables him to differentiate between $2\pi/3$ and $-2\pi/3$).

Figure 4:
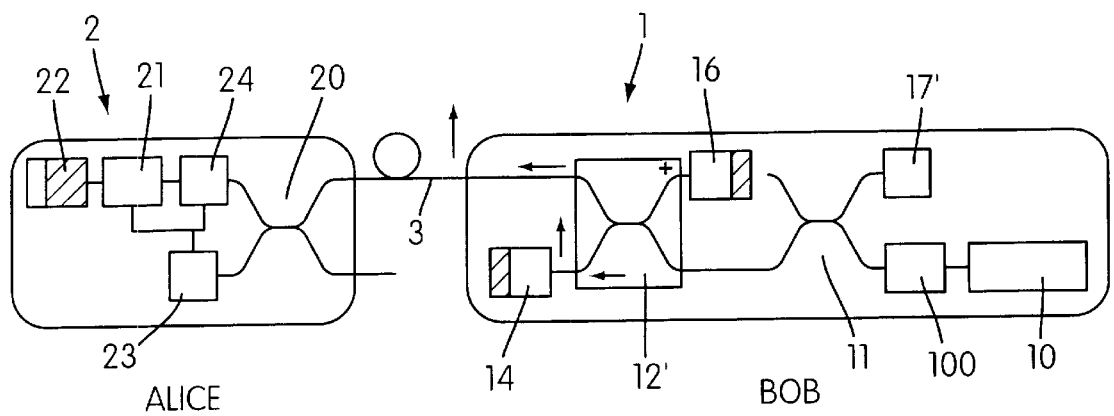
FIG. 4 is a schematic representation of a third embodiment of a device according to the invention.

FIG. 4 shows a block diagram of a third embodiment of an optical communication system according to the invention, configured for the distribution of a key using quantum cryptography and implementing polarization-encoded quantum key distribution. This embodiment features a polarization coupler 12" on Bob's side.

On Alice's side, the same key encoding station 2 as in the first embodiment can be used. On Bob's side, the sending/receiving station 1 comprises a laser 10, a polarization controller 100, a first coupler 11, a polarization coupler 12", a first Faraday mirror 14, a second Faraday mirror 16, and a single-photon polarization detection system 17'. Again, no phase modulator is needed on Bob's side.

The laser 10 uses a polarization controller 100 to send the light with e.g. right circular polarization. The polarization coupler 12" separates the vertical and horizontal polarizations. One of the polarization components, say the vertical one, follows the following sequence of branches (with a polarization switch from vertical to horizontal, and vice versa, each time it is reflected by one of the Faraday mirrors):

Laser 10–mirror 22 (on Alice's)–mirror 16 (on Bob's)–mirror 14–polarization detection system 17'.

On the other hand, the other polarization component (the horizontal one) follows the sequence:

Laser 10–mirror 14–mirror 16–mirror 22 (on Alice's) and to the detection system 17'.

When the two orthogonally polarized pulses recombine at the polarization coupler 12', the polarization of the outgoing pulse depends on their relative phase. For example, a zero phase shift corresponds to right circular polarization (identical to the initial one), while a $\pi$ phase shift corresponds to left circular polarization, and $\pm\pi/2$ phase shifts give linear polarization at $\pm 45°$. A phase change in the phase modulator 21 thus corresponds to a different output polarization. This embodiment thus does not require a second phase modulator on Bob's side, even for the BB84 protocol. Moreover, by using four different choices of phase in the phase modulator 21, four different states can be encoded. The drawback of this embodiment is that it requires a more complicated detection system 17' which can separate the various polarizations. Furthermore, it does require the polarization of the returning pulses to be orthogonal to the polarization of the incoming ones. Therefore, fast polarization fluctuations and the influence of the earth magnetic field may limit the length of the transmission line 3.

Even good single-photon detectors makes errors and occasionally miss photons or count one photon when no photon is actually received (darkcounts). Error correction means, for instance using cyclic redundancy checks, may therefore be provided in Bob's.

Even if the sending/receiving station 1 and the key communicating station 2 are shown as two separates devices in the above specification, it can also be useful to combine a sending/receiving station and a key communicating station in the same device. This combined device can then alternatively play the role of Bob or of Alice, i.e. initiate a key transmission or answer to another device and transmit a key.

Any embodiment of the system of the invention can be easily extended to a multi-stations system, i.e. to a system for distributing a key simultaneously to several mutually connected stations, as suggested for instance in WO95/07583.

The embodiment of FIG. 4 is particularly advantageous from this point of view, as less delayed pulses are sent over the quantum channel.

What is claimed is:

1. Method of communicating between two stations using an interferometric system for quantum cryptography, comprising:

sending at least two light pulses over a quantum channel coupled to the two stations; and detecting interference created by said pulses in one station;

wherein said pulses traverse the same branches of the interferometric system, each of said pulses traversing the same branches in a different sequence so that said pulses are delayed when traversing said quantum channel.

2. Method according to claim 1, wherein said pulses are reflected by at least one Faraday mirror on at least one end of said quantum channel.

3. Method according to claim 1 or claim 2, wherein the average number of photons in said pulses is less than 1.

4. Method according to claim 1, wherein said pulses include a first pulse and a second pulse; and wherein said pulses are sent by a source in a sending/receiving station which delays the second pulse with a delay line, and received by at least one key encoding station which phase modulates the second pulse and reflects both pulses toward said sending/receiving station which delays and phase modulates said first pulse.

5. Method according to claim 4, wherein said second pulse is attenuated in said key encoding station so that an average number of photons in said second pulse reflected back to said sending/receiving station is less than 1.

6. Method according to one of claims 4 or 5, herein both stations choose at random phase shifts applied to said first and second pulses.

7. Method according to claim 6, wherein said phase shifts are chosen as either the value 0 or the value $\pi$, and wherein the interference between said first pulse and said second pulse is constructive when both stations have applied the same phase shift, and totally destructive when they apply different phase shifts.

8. Method according to claim 1, wherein said pulses include at least two orthogonal polarization components; and herein said components traverse the same branches of the interferometric system, each of said components traversing the same branches in a different sequence.

9. Method according to claim 8, wherein one of said stations chooses at random the phase of one of the above polarization components with respect to the phase of another polarization component, thus creating a random output polarization.

10. Interferometric system configured for the distribution of a key over a quantum channel using quantum cryptography, comprising:

at least one sending/receiving station and at least one key encoding station, both coupled to said quantum channel, means in at least one of said stations for sending at least two light pulses over said quantum channel to at least one other said station, detectors in at least one of said stations for detecting interference created by said pulses in said stations, wherein said light pulses traverse the same branches of the interferometric system, each of said pulses traversing the same branches in a different sequence so that said pulses are delayed when traversing said quantum channel.

11. System according to claim 10, wherein at least one of said stations comprises at least one Faraday mirror on at least one end of said quantum channel.

12. System according to one of claims 10 or 11, wherein at least one of said stations comprises means for attenuating the intensity of said light pulses so that the average number of photons in said pulses is less than 1.

13. System according to claim 10, wherein said at least two light pulses include a first pulse and a second pulse;

said sending/receiving station includes a delay line for delaying said first pulse before it is sent over said quantum channel and said second pulse received over said quantum channel, and at least one single photon detector for detecting interference between said first and second pulses; and said key encoding station includes mirrors for reflecting said first and second pulses and at least one phase modulator for modulating the phase of at least one of said pulses.

14. System according to claim 13, wherein said key encoding station comprises means for attenuating the intensity of at least one of said pulses so that the average number of photons in said second pulse reflected back to said sending/receiving station is less than 1.

15. System according to claim 13, wherein both stations choose at random phase shifts applied to said first and second pulses.

16. System according to claim 15, wherein both stations choose said phase shifts as either the value 0 or the value π, and wherein the interference between said first pulse and said second pulse is constructive when both stations have applied the same phase shift, and totally destructive when the stations have applied different phase shifts.

17. System according to claim 10, wherein the light pulses sent by said sending/receiving station comprise at least two orthogonal polarization components, and wherein said components traverse the same branches of said interferometric system, each of said components traversing the same branches in a different sequence.

18. System according to claim 17, wherein one of said stations chooses at random the phase of one of said polarization components with respect to another polarization component, thus creating a random output polarization.

19. Key encoding station for communicating a key to at least one sending/receiving station through a quantum channel comprising:

reflecting means for reflecting a first pulse sent by a receiving station back to said receiving station;

reflecting means for reflecting a second pulse, sent by said receiving station shortly after said first pulse, back to said receiving station; and modulating means for modulating the phase of said second pulse with respect to said first pulse.

20. Key encoding station according to claim 19, further comprising detecting means for detecting said first pulse.

21. Key encoding station according to claim 20, wherein said first pulse and said second pulse both run through said modulating means and are both reflected by the same reflecting means; and wherein said detecting means adjust the phase shift applied by said modulating means immediately after having received said first pulse, so that only said second pulse is phase modulated by said phase modulating means.

22. Key encoding station according to claim 21, wherein the key encoding station chooses at random the phase shift applied to said second pulse.

23. Key encoding station according to claim 21, wherein the phase shift applied by said modulating means is chosen at random among as either the value 0 or the value π.

24. Key encoding station according to claim 19, further comprising an attenuating means for attenuating the light intensity of said second pulse so that the average number of photons in said second pulse reflected back is less than 1.

25. Key encoding station according to claim 24, wherein said attenuating means comprises a coupler sending most of the received light to said detecting means.

26. Key encoding station according to claim 24, wherein said attenuating means comprise an attenuator controlled by said detecting means.

27. Key encoding station according to claim 19, wherein said reflecting means are composed of a Faraday mirror.

28. Key encoding station according to claim 20, wherein said detecting means are not single-photon detectors.

29. Key encoding station according to claim 19, wherein said modulating means are made of a Lithium Niobate (LiNbO$_3$) modulator.

30. Sending/receiving station for receiving a key sent from one key encoding station through a quantum channel, comprising:

a pulsed laser source;

a delay line;

detecting means; and a first coupler connected in such a way that the pulses emitted by said pulsed laser source are split in two pulses;

wherein said delay line is configured such that a first split pulse is directly sent to said quantum channel and a second split pulse is delayed by said delay line before being sent to said quantum channel; and wherein the pulses received from said quantum channel are split in two pulses, the first pulse being directly sent to said detecting means and the second pulse being delayed by said delay line before being sent to said detecting means.

31. Sending/receiving station according to claim 30, further comprising modulating means for modulating the phase of the received pulses delayed by said delay line.

32. Sending/receiving station according to claim 31, wherein said modulating means choose at random phase shifts applied to said delayed pulses.

33. Sending/receiving station according to claim 32, wherein said modulating means choose said phase shifts at random as either the value 0 or the value π.

34. Sending/receiving station according to one of the claims 31 to 33, wherein said modulating means are made of a Lithium Niobate (LiNbO$_3$) modulator.

35. Sending/receiving station according to claim 30, further comprising two detectors, wherein said first coupler is a 3×3 coupler connected to said detectors, and wherein a pulse will be sent either to the first or to the second of said detectors depending on the interference created in said coupler.

36. Sending/receiving station according to claim 30, wherein said laser source sends light pulses with a circular polarization, and wherein said first coupler is a polarization coupler that separates the vertical and horizontal polarizations of the pulses.

37. Sending/receiving station according to claim 30, wherein said delay line comprises two Faraday mirrors reflecting the delayed pulses.

38. Sending/receiving station according to claim 30, wherein said detecting means are single-photon detectors.

39. Sending/receiving station according to claim 38, wherein said single-photon detectors are avalanche photo diodes biased beyond reverse breakdown and operating in the Geiger mode.

40. Sending/receiving station according to claim 38, wherein the single-photon detectors are activated only each time a photon is expected.

41. Sending/receiving station according to claim 30, wherein said pulsed laser source is a DFB laser.

42. Sending/receiving station according to claim 30, further comprising error correcting means.

43. Device for the distribution of a key over a quantum channel using quantum cryptography, comprising a sending/receiving station according to claim 30 and a key encoding station according to claim 20.

44. Multi-station system for the distribution of a key over a quantum channel using quantum cryptography between at least one sending/receiving station and at least one key encoding station, comprising at least one sending/receiving station according to claim 30 and at least one key encoding station according to claim 20.

* * * * *